United States Patent [19]
Gordon et al.

[11] 3,969,486
[45] July 13, 1976

[54] PROCESS FOR SYNTHESIS OF CHLORODIFLUOROAMINE

[75] Inventors: Joseph Gordon, Morris Township, Morris County; Bernard Sukornick, Elizabeth, both of N.J.

[73] Assignee: Allied Chemical Corporation, Morris Township, N.J.

[22] Filed: Aug. 15, 1962

[21] Appl. No.: 218,479

[52] U.S. Cl. .................. 423/351; 423/466; 423/472
[51] Int. Cl.² ............. C01B 21/52; C01B 7/00
[58] Field of Search ............ 23/14, 190; 423/351, 423/466, 472

[56] References Cited
UNITED STATES PATENTS

| | | |
|---|---|---|
| 3,084,025 | 4/1963 | Gardner .................. 423/351 |
| 3,101,997 | 8/1963 | Freeman et al. .......... 423/351 |
| 3,134,638 | 5/1964 | Lawton et al. ............ 423/351 |
| 3,273,975 | 9/1966 | Marshall .................. 423/351 |
| 3,314,770 | 4/1967 | Knipe et al. .............. 423/351 |
| 3,472,634 | 10/1969 | Marshall et al. .......... 423/351 |
| 3,488,163 | 1/1970 | Lawton et al. ............ 423/351 |

*Primary Examiner*—Richard E. Schafer
*Attorney, Agent, or Firm*—Ernest A. Polin; Jay P. Friedenson

[57] ABSTRACT

A process of making chlorodifluoroamine by introducing gaseous fluorine azide and at least a stoichiometric equivalent of gaseous chlorine into a reaction zone maintained at a temperature of 20° to 100°C.

6 Claims, No Drawings

PROCESS FOR SYNTHESIS OF CHLORODIFLUOROAMINE

This invention relates to improved processes for making chlorodifluoroamine, $F_2NCl$, a compound which is normally a colorless gas and which has a boiling point of about minus 67° C. and a melting point of about minus 182° C. Chlorodifluoroamine is useful as a chemical intermediate, for example the compound may be subjected to the action of ultraviolet light by known technique to make tetrafluorohydrazine, $N_2F_4$, a commercially available material.

An object of the invention is to provide commercially feasible, procedurally simple methods for making chlorodifluoroamine from inexpensive, available raw materials.

In accordance with the invention, it has been found that fluorine azide and chlorine may be reacted under certain easily controlled, one-step, gas-phase conditions to form chlorodifluoroamine. The inventin comprises the discovery of the reactability of fluorine azide and chlorine, and of certain reaction conditions which interdependently cooperate to constitute practicable and easily controlled methods for making chlorodifluoroamine. Fluorine azide may be readily made from sodium azide, sulfuric acid and fluorine by a safe, practicable method. Hence, the sodium azide, sulfuric acid, fluorine and chlorine raw materials utilized in practice of the invention are relatively inexpensive and readily available.

Fluorine azide, $FN_3$, is a known greenish yellow normally gaseous material having a boiling point of about minus 78° C. to minus 82° C. and a melting point of about minus 154° C., and may be made according to any suitable known method. The following illustrative procedure, although utilizing elemental fluorine affords a particularly advantageous technique because only a quantitative amount of fluorine is used, and the reaction is smooth and without explosive tendencies. Apparatus employed included a three-necked flask fitted with a helium inlet tube, a burette, and an outlet tube leading to a Drierite scrubber. A sulfuric acid solution of about 76% $H_2 SO_4$ strength was flowed from the burette drop-wise onto powdered sodium azide, $NaN_3$, in the flask at rate of about 0.05 cc/min. The $NaN_3$ material in the generator was held at temperature of about 48° C., by means of an electrically heated tape, to prevent liquefaction of the $HN_3$ formed. Hydrazoic acid gs, $HN_3$, was evolved at a rate of about 0.08 mol/hr. The $HN_3$ thus produced was diluted with helium and the gaseous mixture passed thru the Drierite to remove all traces of water and form an anhydrous mixture. Quantity of helium employed for dilution was such that the gas mixture contained $HN_3$ and helium in volume ratio of about one to three. The anhydrous $HN_3$-helium gas mixture was run into the head end of a copper reactor coil, about 12 ft. long and about ¼ inch I.D., at rate to supply about 0.08 mol/hr of $HN_3$. At the same time, elemental fluorine diluted with nitrogen was introduced into the head end of the reactor coil. Nitrogen dilution was such as to form a mixture having a fluorine to nitrogen volume ratio of about one to 0.75. Rate of introduction of the fluorine-nitrogen mixture into the reactor was such as to charge elemental fluorine at a rate of about 0.045 mol/hr., i.e. slightly more than 0.5 mol of fluorine was fed per mol of $HN_3$. During the ensuing reaction, the reactor was maintained at temperature of about 25° C. The gaseous exit of the reactor contained fluorine azide, nitrogen and helium. Dilution of the fluorine azide gas with helium and nitrogen inerts was such as to provide a fluorine azide-gaseous inerts volume ratio of about one to three. Infrared spectrum analysis of the gaseous exit of the reactor showed a complete absence of nitrogen trifluoride, thus showing no detectable conversion of $FN_3$ to $NF_3$ by the slight excess of fluorine present.

To avoid tendencies toward instability, the fluorine azide starting material employed in all modifications of the invention is preferably always maintained, handled and used in gas phase, i.e. the azide should be maintained at temperatures well above the minus 78-minus 82° C. boiling point, so that the material is always in gas phase. Operations herein are preferably carried out at substantially atmospheric pressure, although other pressures may be employed while having regard for maintenance of the azide in the gas phase. Further, to avoid possible explosion, a volume of $FN_3$ is preferably kept diluted with at least two volumes of an inert gas such as nitrogen or helium.

The process of the invention may be carried out by a simple one-step gas-phase reaction in which the reactants, aside from inert diluting gases, preferably consist of fluorine azide and elemental chlorine. Mechanics of the reactions taking place are not clear or very well understood. However, it is believed overall reaction may be summarized by

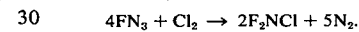

$$4FN_3 + Cl_2 \rightarrow 2F_2NCl + 5N_2.$$

Broadly, practice of the process of the invention comprises introducing gaseous fluorine azide and gaseous chlorine into a reaction zone, maintaining certain reactive temperatures in the reaction zone not substantially in excess of 100° C., and discharging from the reaction zone reaction products containing chlorodifluoroamine.

Reactions are carried out so that all materials in the reaction zone are in the gas phase. Apparatus employed is relatively simple, and may comprise an elongated straight-line tubular reactor or a tubular coil reactor of substantial length, e.g. 5–50 feet long before coiling, and of relatively small inside diameter e.g. ⅛ to ½ inch. Whichever the type of reactor, the same may be enveloped in a tubular electric furnace equipped with accessories to facilitate maintenance in the reactor of herein indicated temperatures. The reactor, preferably unpacked in the gas space, may be provided at one end with valved inlets for metered charging of incoming gaseous fluorine azide and incoming gaseous chlorine, and at the other end with a gas outlet which may be connected to the inlet of a cold trap system associated with refrigerating equipment to maintain the system at desired low temperatures. The final trap is usually provided with a gas vent to permit passage thru the trap of inert diluting gas and other gases uncondensable at the temperatures of refrigeration, and may be equipped with other valved outlets thru which, during a reaction run, liquid condensate may be drawn off to a fractionator, or, following the reaction run, condensate may be fractionated off to recover chlorodifluoroamine and to separate the same from other materials. Apparatus may be made of any suitable material, such as nickel, copper, Monel, and stainless steel, which is corrosive-resistant to the reactants and products and by-products involved.

In accordance with the invention it has been found that fluorine azide and elemental chlorine, when brought together, may be reacted at relatively low temperatures to form chlorodifluoroamine. Gaseous fluorine azide and gaseous chlorine are usually available at temperatures around 20° C. Reaction of fluorine azide and chlorine is indicated at about room temperature (i.e. 20° C.) or a little above, at substantially atmospheric pressure. However, it has been found that reaction becomes more acceptably vigorous at temperature not less than about 50° C., and lower reaction temperature is not preferred. It has been found that stability of fluorine azide in gas form is adequately maintained at temperatures not higher than about 100° C., and accordingly reaction temperatures may lie substantially in the range of 50°–100° C. However, to enhance fluorine azide stability it is preferred to hold maximum temperature not substantially higher than about 85° C., preferred operating temperatures thus being substantially in the range of 50°–85° C.

A further feature of major importance in practice of the invention is molor proportions of fluorine azide and elemental chlorine. While possible to operate using at least a stoichiometric equivalent of chlorine, i.e. about 0.25 molecular proportion of chlorine per mol of $FN_3$, it has been found that in carrying out the reactions described it is highly desirable to employ a molecular excess of chlorine, and we find that for good operation chlorine should be charged to the reaction zone in proportion not substantially less than 0.5 mol per mol of the fluorine azide charged, i.e. a 100% molecular excess of chlorine. More desirably, at least one mol of chlorine per mol of $FN_3$ is utilized, and in preferred operation we employ chlorine to fluorine azide in proportions of one to two mols of chlorine per mol of $FN_3$. Higher quantities of chlorine up to economic limits may be used, although amounts of chlorine in excess of about two mols per mol of $FN_3$ afford no particular advantage. The indicated molecular excesses of chlorine progressively provide for the better reaction results, minimization of dimerization of $FN_3$ to $F_2N_2$, and more importantly prevents the presence of unreacted $FN_3$ in the reactor exit which $FN_3$, if present and entering the recovery cold traps operating at low temperatures might pass thru the unstable gas to liquid stage.

Residence time of reactants in the reactor is variable, and is dependent to some extent on other variables such as particular design of the reactor employed. However, optimum residence time is the most easily regulated variable and hence, depending upon particular apparatus available, may be determined by a test run or two. In general, residence time may lie in the range of about 25–250 seconds, and is preferably not less than about 60 seconds.

Aside from inert diluents, the reactor exit contains principally $F_2NCl$ b.p. minus 67° C. and chlorine, $F_2N_2$ b.p. minus 106–111° C., and not much more than trace amounts of $SiF_4$, and $CF_4$ b.p. minus 128° C. Recovery of chlorodifluoroamine and separation of the same from other materials contained in the gaseous exit of the reaction zone may be effected more or less conventionally as known in this art, i.e. by condensation, followed by suitable fractionation. Ordinarily, because of the preferred use of a substantial excess of chlorine in the reaction zone, the reactor exit may contain considerable chlorine but no significant amount of $FN_3$ b.p. minus 78–82° C. The high boiling chlorine in the reactor exit, facilitated by gas stream dilution, may be seperated out by preliminary refrigeration to any conveniently low temperature. Further, chlorine in the reactor exit may be conveniently removed by passing the gas stream thru a scrubber containing e.g. a 10% NaOH solution. In the case of use of a caustic scrubber, any small amount of $FN_3$ which might be present is also separated out of the gas stream. Subsequent to the scrubber, the gas stream may be dried as by Drierite, and thereafter, except for nitrogen and any helium, may be totally condensed in a cold trap refrigerated by means of liquid oxygen or nitrogen to e.g. minus 180–196° C., nitrogen and helium being vented thru the trap. In subsequent fractionation of cold trap condensate, $F_2N_2$ plus trace amounts of $CF_3$ and $SiF_4$ may be removed as overhead, retaining $F_2NCl$ as still bottoms. Thereafter, the $F_2NCl$ may be distilled for further purification. Alternatively, the dried gas stream may be refrigerated to any low temperature just suitable below the minus 67° C. boiling point of $F_2NCl$, e.g. to dry ice temperature of about minus 78° C. In this situation, $CF_4$, $SiF_4$ and $F_2N_2$ are vented off from the cold trap along with nitrogen and helium, and at the end of the run the cold trap may be permitted to warm up and $F_2NCl$ recovered as overhead. Further, in a continuous operation condensates may be continuously withdrawn from the cold trap and fractionated in separate equipment.

The following illustrates practice of the invention. The reactor comprised a coil made from a 20 ft. length of ¼inch I.D. copper tubing. The reactor was enveloped in a heater provided with automatically controlled facilities for maintaining desired reaction temperatures, and was equipped at one end with an inlet for regulated introduction of gaseous $FN_3$ and an inlet for regulated introduction of gaseous chlorine, and at the other end with a gas outlet. Over a period of about 25 minutes, fluorine azide gas, substantially at room temperature and made as described above and having a fluorine azide-gaseous inerts volume ratio of about one to three, was fed into the reactor at a rate of about 0.085 mol/hr. ($FN_3$ basis). Simultaneously, with introduction of the fluorine azide gas, gaseous chlorine substantially at room temperature was charged into the reactor at a rate of about 0.120 mol/hr. Mol ratio of reactants fed was about 1.4 mols of chlorine per mol of $FN_3$. Throughout the run, temperature in the reactor was maintained substantially at about 75° C., and pressure in the system was about 2 psig. Rates of feed of incoming reactants was such that residence time in the reactor was about 60–90 seconds. Infrared spectrum and vapor phase chromatographic analyses showed that, aside from helium and nitrogen, gaseous exit of the reactor contained $F_2NCl$, chlorine, $N_2F_2$, a small amount of $CO_2$ believed to be an impurity in the chlorine used, and trace quantities of $CF_4$ and $SiF_4$. To remove chiefly chlorine from the gas stream, the reactor exit was run thru two cold traps connected in series and each maintained at temperature of about minus 96° C. The exit of the second minus 96° C. trap was run into a collection cylinder maintained at temperature of about minus 155° C. Helium and nitrogen were vented from the collection cylinder, and there were collected in the cylinder in liquid form, $F_2NCl$ product and $F_2N_2$, and trace amounts of $SiF_4$ and $CF_4$. The cylinder was warmed up sufficiently to distill off $F_2NCl$, $F_2N_2$, and traces of $CF_4$ and $SiF_4$. Infrared and chromatographic analysis of the gas showed the same to contain $F_2NCl$ (yield about 15% on the basis of the $FN_3$ fed) and a larger amount of $F_2N_2$. $SiF_4$ and $CF_4$ were present only in trace amounts, and no $FN_3$ was detected.

We claim:

1. The process for making chlorodifluoroamine which comprises introducing gaseous fluorine azide and at least a stoichrometric equivalent of gaseous chlorine into a reaction zone, maintaining temperature in the reaction zone substantially in the range of 20°–100° C., and discharging chlorodifluoroamine from the reaction zone.

2. The process of claim 1 in which temperature is substantially in the range of 50°–100° C.

3. The process of claim 1 in which fluorine azide and chlorine are fed in proportions of not less than 0.5 mol of chlorine per mol of fluorine azide.

4. The process of claim 1 in which the volume of gaseous fluorine azide charged is diluted with at least two volumes of an inert gas.

5. The process for making chlorodifluoroamine which comprises introducing gaseous fluorine azide and gaseous chlorine into a reaction zone in proportions of one mol of fluorine azide to not less than one mol of chlorine, maintaining temperature in the reaction zone substantially in the range of 50°–85° C., and discharging chlorodifluoroamine from the reaction zone.

6. The process of claim 5 in which fluorine azide and chlorine are fed in proportions of substantially 1–2 mols of chlorine per mol of fluorine azide.

* * * * *